United States Patent
Jeong et al.

(10) Patent No.: US 12,455,378 B2
(45) Date of Patent: Oct. 28, 2025

(54) APPARATUS AND METHOD FOR TRACKING AN OBJECT USING A LiDAR SENSOR

(71) Applicants: HYUNDAI MOTOR COMPANY, Seoul (KR); KIA CORPORATION, Seoul (KR)

(72) Inventors: Mu Gwan Jeong, Seoul (KR); Nam Gyun Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 1047 days.

(21) Appl. No.: 17/395,261

(22) Filed: Aug. 5, 2021

(65) Prior Publication Data
US 2022/0179080 A1 Jun. 9, 2022

(30) Foreign Application Priority Data
Dec. 9, 2020 (KR) .................. 10-2020-0171572

(51) Int. Cl.
*G01S 17/89* (2020.01)
*G01B 11/24* (2006.01)
*G01S 7/48* (2006.01)
*G01S 17/66* (2006.01)

(52) U.S. Cl.
CPC .............. *G01S 17/66* (2013.01); *G01B 11/24* (2013.01); *G01S 7/4808* (2013.01); *G01S 17/89* (2013.01)

(58) Field of Classification Search
CPC ........ G01S 17/66; G01S 7/4808; G01S 17/89; G01S 7/4802; G01S 17/931; G01S 7/497; G01S 17/08; G01B 11/24; G06F 18/24; G06T 7/11
See application file for complete search history.

(56) References Cited

U.S. PATENT DOCUMENTS

| | | | |
|---|---|---|---|
| 11,815,897 B2 * | 11/2023 | Nabatchian | G01S 17/89 |
| 2020/0109954 A1 * | 4/2020 | Li | G08G 1/0112 |
| 2021/0063200 A1 * | 3/2021 | Kroepfl | G01S 7/417 |

(Continued)

OTHER PUBLICATIONS

Suk-Ho Jang et al., Research of object classification algorithm based on LIDAR for UGV, 2011 IEEE ICCAS, Automation and Systems, 4 pp.

*Primary Examiner* — Juan M Guillermety
(74) *Attorney, Agent, or Firm* — Lempia Summerfield Katz LLC

(57) ABSTRACT

An object-tracking method using a LiDAR sensor according to an embodiment includes: generating a grid map based on a point cloud generated with respect to an object using a LiDAR sensor mounted to a vehicle traveling in an x-axis direction; performing static labeling when the absolute value of the y-coordinate of the center of each grid on the grid map in a y-axis direction that intersects the x-axis direction is less than a y-axis coordinate threshold value; and performing dynamic labeling when the absolute value is not less than the y-axis coordinate threshold value. Since both static labeling and dynamic labeling are utilized, it is possible to improve the performance of outputting information about an object that is elongated, thus improving the performance of an autonomous driving system, such as prediction of a travel route and map matching.

16 Claims, 14 Drawing Sheets

(56) References Cited

U.S. PATENT DOCUMENTS

| | | | |
|---|---|---|---|
| 2022/0048530 A1* | 2/2022 | Wyffels | G01S 7/4802 |
| 2022/0076432 A1* | 3/2022 | Ramezani | G01S 7/4808 |
| 2022/0214444 A1* | 7/2022 | Das | G01S 7/4802 |

* cited by examiner

APPARATUS AND METHOD FOR TRACKING AN OBJECT USING A LiDAR SENSOR

This application claims the benefit of priority to Korean Patent Application No. 10-2020-0171572, filed on Dec. 9, 2020, which is hereby incorporated by reference as if fully set forth herein.

BACKGROUND

Field of the Disclosure

The present disclosure relates to an apparatus and a method for tracking an object using a LiDAR sensor.

Discussion of the Related Art

Various technologies for realizing autonomous driving of vehicles have been developed. For example, information about a target vehicle may be acquired using a light detection and ranging (LiDAR) sensor, and an autonomous driving function of vehicles may be assisted using the acquired information. However, there is a problem in that the accuracy of a cluster, which is formed by clustering a point cloud acquired through a LiDAR sensor, is low. Therefore, research for solving this problem is underway.

SUMMARY

Accordingly, the present disclosure is directed to an apparatus and a method for tracking an object using a LiDAR sensor that substantially obviate one or more problems due to limitations and disadvantages of the related art.

The present disclosure provides an apparatus and a method for tracking an object using a LiDAR sensor that achieve excellent clustering.

However, the objects to be accomplished by the present disclosure are not limited to the above-mentioned objects. Other objects not mentioned herein should be clearly understood by those having ordinary skill in the art from the following description.

An object-tracking method using a LiDAR sensor according to an embodiment may include generating a grid map based on a point cloud generated with respect to an object using a LiDAR sensor mounted to a vehicle traveling in an x-axis direction. The method may also include performing static labeling when the absolute value of the y-coordinate of the center of each grid on the grid map in a y-axis direction that intersects the x-axis direction is less than a y-axis coordinate threshold value. The method may further include performing dynamic labeling when the absolute value is not less than the y-axis coordinate threshold value. In the static labeling, the spacing distance between a first point and a second point, respectively located in a first grid and a second grid that are different from each other and are compared with each other, may be compared with a first threshold value that is a fixed value, and the first grid and the second grid may be included in the same cluster depending on the result of the comparison. In the dynamic labeling, whether to include the first grid and the second grid in the same cluster may be determined using a second threshold value that varies depending on first and second angles, respectively formed by the first and second points based on the position of the LiDAR sensor, and the spacing distance and using a third threshold value that varies depending on the distance from the position of the LiDAR sensor to the first point or the second point.

For example, the performing the static labeling may include: obtaining the spacing distance; checking whether the spacing distance is less than the first threshold value; including the first grid and the second grid in the same cluster when the spacing distance is less than the first threshold value; and preventing the first grid and the second grid from being included in the same cluster when the spacing distance is not less than the first threshold value.

For example, the performing the dynamic labeling may include checking whether the grid angle at which each grid is located with respect to a traveling axis, passing through the position of the LiDAR sensor in the x-axis direction on the grid map, is less than an angle threshold value. The performing the dynamic labeling may also include checking whether the first coordinate difference between the y-axis coordinates of the first point and the second point is less than a first coordinate threshold value when the grid angle is less than the angle threshold value. The performing the dynamic labeling may further include checking whether the second coordinate difference between the x-axis coordinates of the first point and the second point is less than a second coordinate threshold value when the first coordinate difference is less than the first coordinate threshold value. The performing the dynamic labeling may also include checking whether, among internal angles of a triangle formed by the position of the LiDAR sensor and the first and second points, the angular difference between a first internal angle being the first angle formed at the position at which the first point is located and a second internal angle being the second angle formed at the position at which the second point is located is less than the second threshold value when the second coordinate difference is less than the second coordinate threshold value. The performing the dynamic labeling may further include checking whether the spacing distance is less than the third threshold value when the angular difference is less than the second threshold value. The performing the dynamic labeling may also comprise including the first grid and the second grid in the same cluster when the spacing distance is less than the third threshold value.

For example, the second threshold value may vary in proportion to the angular difference between the first internal angle and the second internal angle.

For example, the second threshold value may have the following relationship with the angular difference.

$$TH2 = 1 - \cos\frac{\alpha_1 - \alpha_2}{2} = 1 - \frac{(r_1 + r_2)\sin\alpha_3}{2d\sin(90° - \frac{\alpha_3}{2})}$$

Here, "TH2" represents the second threshold value, "d" represents the spacing distance, "$\alpha_1$" represents the first internal angle, "$\alpha_2$" represents the second internal angle, "$\alpha_3$" represents a third internal angle formed at the position at which the LiDAR sensor is located, among the internal angles of the triangle, "$r_1$" represents a first length from the position of the LiDAR sensor to the first point, and "$r_2$" represents a second length from the position of the LiDAR sensor to the second point.

For example, the second threshold value may be greater than 0 and less than 2 and may increase nonlinearly in proportion to the angular difference.

For example, the third threshold value may be obtained as follows.

$$D = \frac{r_2 \sin\alpha_3}{\sin\alpha_R}$$

Here, "D" represents the third threshold value, and "$\alpha_R$" represents the angle between an extension line of a straight line connecting the position of the LiDAR sensor and the first point and a third line segment. The third line segment is a line segment connecting a threshold point and the second point. The threshold point is a point that is located on the extension line of the straight line connecting the position of the LiDAR sensor and the first point and is spaced apart from the second point by a distance equivalent to the third threshold value.

For example, the third threshold value may be obtained as follows.

$$D = \frac{r_2 \sin\alpha_3}{\sin(\theta - \alpha_3)} + \beta$$

Here, "θ" represents the angle between an extension line of a straight line connecting the position of the LiDAR sensor and the second point and the third line segment, and "β" represents a parameter related to an error of the LiDAR sensor.

An object-tracking apparatus using a LiDAR sensor according to another embodiment may include a LiDAR sensor mounted to a vehicle traveling in an x-axis direction in order to generate a point cloud related to an object. The apparatus may also include a grid map generation unit configured to generate a grid map based on the point cloud. The apparatus may further include a labeling type determination unit configured to compare the absolute value of the y-coordinate of the center of each grid on the grid map in a y-axis direction that intersects the x-axis direction with a y-axis coordinate threshold value and to output the result of the comparison as a control signal. The apparatus may also include a static labeling unit configured to compare the spacing distance between a first point and a second point, respectively located in a first grid and a second grid that are different from each other and are compared with each other, with a first threshold value that is a fixed value in response to the control signal and to include the first grid and the second grid in the same cluster depending on the result of the comparison. The apparatus may further include a dynamic labeling unit configured to determine whether to include the first grid and the second grid in the same cluster using a second threshold value that varies depending on first and second angles, respectively formed by the first and second points based on the position of the LiDAR sensor, and the spacing distance and using a third threshold value that varies depending on the distance from the position of the LiDAR sensor to the first point or the second point in response to the control signal.

For example, the static labeling unit may include: a distance calculation unit configured to calculate the spacing distance; a first distance comparison unit configured to compare the spacing distance with the first threshold value; and a first labeling unit configured to include the first grid and the second grid in the same cluster in response to the result of comparison by the first distance comparison unit.

For example, the dynamic labeling unit may include a grid angle comparison unit configured to compare the grid angle at which each grid is located with respect to a traveling axis, passing through the position of the LiDAR sensor in the x-axis direction on the grid map, with an angle threshold value. The dynamic labeling unit may also include a first coordinate comparison unit configured to compare the first coordinate difference between the y-axis coordinates of the first point and the second point with a first coordinate threshold value in response to the result of comparison by the grid angle comparison unit. The dynamic labeling unit may further include a second coordinate comparison unit configured to compare the second coordinate difference between the x-axis coordinates of the first point and the second point with a second coordinate threshold value in response to the result of comparison by the first coordinate comparison unit. The dynamic labeling unit may also include an angular difference comparison unit configured to compare, among the internal angles of a triangle formed by the position of the LiDAR sensor and the first and second points, the angular difference between a first internal angle being the first angle formed at the position at which the first point is located and a second internal angle being the second angle formed at the position at which the second point is located with the second threshold value in response to the result of comparison by the second coordinate comparison unit. The dynamic labeling unit may further include a second distance comparison unit configured to compare the spacing distance with the third threshold value in response to the result of comparison by the angular difference comparison unit. The dynamic labeling unit may also include a second labeling unit configured to include the first grid and the second grid in the same cluster in response to the result of comparison by the second distance comparison unit.

For example, the second threshold value may vary in proportion to the angular difference between the first internal angle and the second internal angle.

For example, the second threshold value may have the following relationship with the angular difference.

$$TH2 = 1 - \cos\frac{\alpha_1 - \alpha_2}{2} = 1 - \frac{(r_1 + r_2)\sin\alpha_3}{2d\sin(90° - \frac{\alpha_3}{2})}$$

Here, "TH2" represents the second threshold value, "d" represents the spacing distance, "$\alpha_1$" represents the first internal angle, "$\alpha_2$" represents the second internal angle, "$\alpha_3$" represents a third internal angle formed at the position at which the LiDAR sensor is located, among the internal angles of the triangle, "$r_1$" represents a first length from the position of the LiDAR sensor to the first point, and "$r_2$" represents a second length from the position of the LiDAR sensor to the second point.

For example, the second threshold value may be greater than 0 and less than 2 and may increase nonlinearly in proportion to the angular difference.

For example, the third threshold value may be obtained as follows.

$$D = \frac{r_2 \sin\alpha_3}{\sin\alpha_R}$$

Here, "D" represents the third threshold value, and "$\alpha_R$" represents the angle between an extension line of a straight line connecting the position of the LiDAR sensor and the first point and a third line segment. The third line segment is a line segment connecting a threshold point and the second point. The threshold point is a point that is located on the extension line of the straight line connecting the position of the LiDAR sensor and the first point and is spaced apart from the second point by a distance equivalent to the third threshold value.

For example, the third threshold value may be obtained as follows.

$$D = \frac{r_2 \sin\alpha_3}{\sin(\theta - \alpha_3)} + \beta$$

Here, "θ" represents the angle between an extension line of a straight line connecting the position of the LiDAR sensor and the second point and the third line segment, and "B" represents a parameter related to an error of the LiDAR sensor.

BRIEF DESCRIPTION OF THE DRAWINGS

Arrangements and embodiments are described in detail with reference to the following drawings, in which like reference numerals refer to like elements and wherein.

DETAILED DESCRIPTION OF THE INVENTION

The present disclosure is now described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure is more thorough and complete, and more fully conveys the scope of the disclosure to those having ordinary skill in the art.

It should be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements. When a component, device, element, or the like of the present disclosure is described as having a purpose or performing an operation, function, or the like, the component, device, or element should be considered herein as being "configured to" meet that purpose or to perform that operation or function. The present disclosure describes various components of an object tracking apparatus as units, such as: a pre-processing unit; a grid map generation unit; a labelling type determination unit; a static labelling unit; a dynamic labelling unit; a distance calculation unit; first and second distance comparison units; first and second labelling units; a grid angle comparison unit; first and second coordinate comparison units; and an angular difference comparison unit. Each of these units may separately embody or be included with a processor and a memory, such as a non-transitory computer readable media, as part of the apparatus.

Hereinafter, an apparatus and a method for tracking an object using a LiDAR sensor according to embodiments are described with reference to the accompanying drawings. The apparatus 100 and the method for tracking an object using a LiDAR sensor are described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. In other words, in another embodiment, the x-axis, the y-axis, and the z-axis may intersect each other obliquely.

Figure 1:
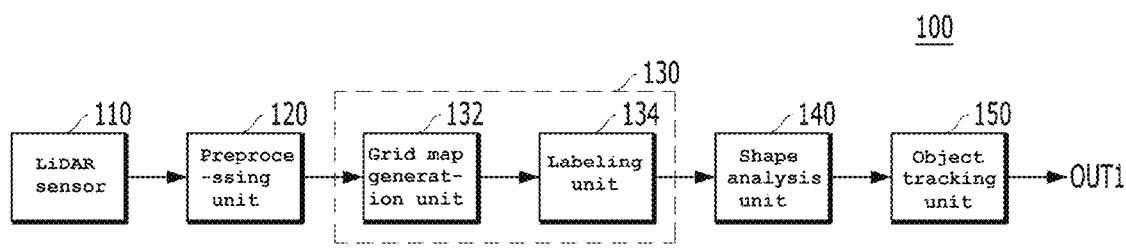
FIG. 1 is a schematic block diagram of an object-tracking apparatus according to an embodiment.

FIG. 1 is a schematic block diagram of an object-tracking apparatus 100 according to an embodiment.

The object-tracking apparatus 100 may include a light detection and ranging (LiDAR) sensor 110, a preprocessing unit 120, a clustering unit 130, a shape analysis unit (or a segment unit) 140, and an object tracking unit (a tracking unit, a tracking and classification unit, or an object-detecting unit) 150.

Figure 2:
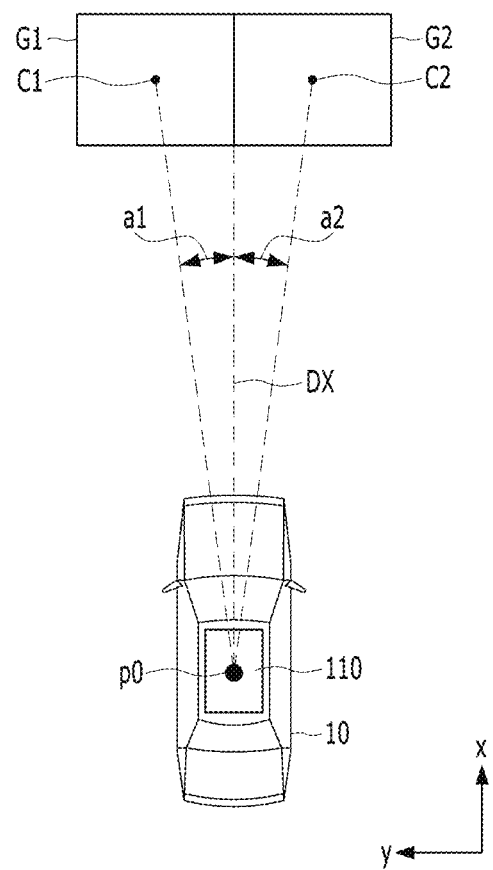
FIG. 2 is a plan view of a vehicle equipped with a LiDAR sensor.

FIG. 2 is a plan view of a vehicle 10 equipped with the LiDAR sensor 110 (hereinafter referred to as a "host vehicle"). As an example, for better understanding, the LiDAR sensor 110 is illustrated as being disposed on the roof of the host vehicle 10. However, the embodiments are not limited as to the specific position at which the LiDAR sensor 110 is mounted to the host vehicle 10.

The LiDAR sensor 110 obtains a point cloud related to an object. For example, the LiDAR sensor 110 may radiate a single circular laser pulse having a wavelength of 905 nm to 1550 nm to an object present within a measurement range and may measure the time taken for the laser pulse reflected from the object to return. Thus, the LiDAR sensor 110 may sense information about the object, such as for example, the distance from the LiDAR sensor 110 to the object, the orientation of the object, the speed of the object, the temperature of the object, the material distribution of the object, and the concentration characteristics of the object. Here, the object may be, for example, another vehicle, a person, or an obstacle present outside the host vehicle 10 equipped with the LiDAR sensor 110. However, the embodiments are not limited to any specific type of object. Hereinafter, the host vehicle 10 equipped with the LiDAR sensor 110 is described as traveling in the x-axis direction, as shown in FIG. 2.

The preprocessing unit 120 may remove data related to reflection from the body of the host vehicle 10. In other words, since there is a region that is shielded by the body of the host vehicle 10 depending on the mounting position and the field of view of the LiDAR sensor 110, the preprocessing unit 120 may remove data related to reflection from the body of the host vehicle 10 using a reference coordinate system.

The preprocessing unit 120 may be omitted from the object-tracking apparatus 100 according to the embodiment.

The clustering unit 130 groups the point cloud, which is the LiDAR data composed of a plurality of points related to the object acquired through the LiDAR sensor 110, into meaningful units according to a predetermined criterion. If the preprocessing unit 120 is not omitted, the clustering unit 130 may group the LiDAR data preprocessed by the preprocessing unit 120. For example, the clustering unit 130 may group the point cloud by applying a grid-based clustering method or a density-based clustering method thereto to perform clustering to generate the contour of the object. The result of sensing by the LiDAR sensor 110 shows a plurality of points, each of which has only information about a location (or coordinates). Therefore, the clustering unit 130 serves to group the plurality of points sensed by the LiDAR sensor 110 into units having meaningful shapes and to generate clusters, which are the result of the grouping.

The shape analysis unit 140 generates information about a plurality of segment boxes for each channel using the result of clustering by the clustering unit 130. Here, the segment box may be the result of converting the result of the clustering into a geometric box shape. In addition, the information about the segment box may be at least one of the width, length, position, or direction (or heading) of the segment box.

The object tracking unit 150 may determine whether the object, the shape of which has been analyzed, is an obstacle, a vehicle, or a person, and may recognize the same. In addition, the object tracking unit 150 may output the result of the recognition through an output terminal OUT1.

Hereinafter, the apparatus 100 and the method for tracking an object using a LiDAR sensor according to the embodiments are described with reference to the accompanying drawings.

Figure 4:
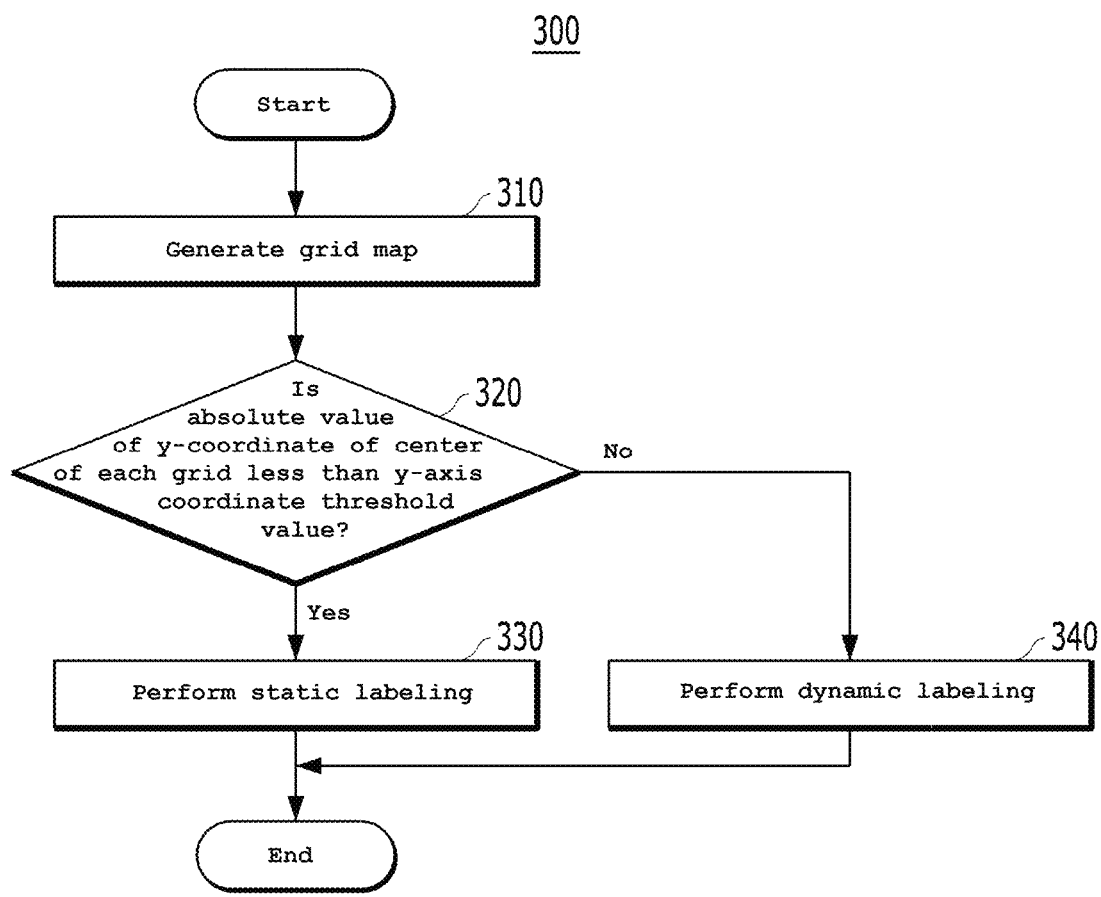
FIG. 4 is a flowchart of a clustering method according to an embodiment that is performed by the clustering unit shown in FIG. 1.

FIG. 4 is a flowchart of a clustering method 300 according to an embodiment that is performed by the clustering unit 130 shown in FIG. 1.

In order to perform the clustering method 300 shown in FIG. 4, the clustering unit 130 shown in FIG. 1 may include a grid map generation unit 132 and a labeling unit 134.

Although the clustering method 300 shown in FIG. 4 is described as being performed by the clustering unit 130 shown in FIG. 1, the embodiment is not limited thereto. In other words, according to another embodiment, the clustering method 300 shown in FIG. 4 may be performed by a clustering unit configured differently from the clustering unit 130 shown in FIG. 1. The clustering unit 130 shown in FIG. 1 may perform a clustering method configured differently from the clustering method 300 shown in FIG. 4.

Figure 3:
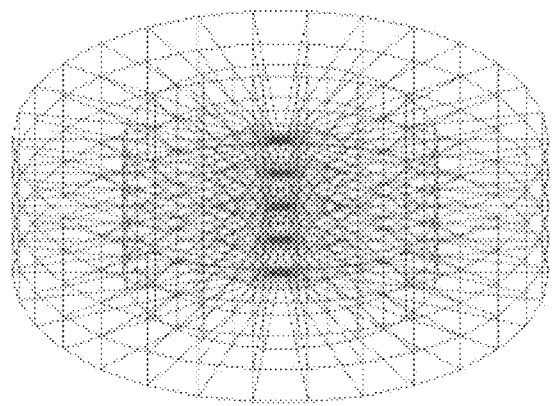
FIG. 3 shows an example of a 2.5-dimensional (2.5D) grid map.

FIG. 3 shows an example of a 2.5-dimensional (2.5D) grid map.

The grid map generation unit 132 generates a grid map based on the point cloud related to the object, which is generated by the LiDAR sensor 110, and outputs the generated grid map to the labeling unit 134 (step 310). For example, the grid map generation unit 132 may generate a two-dimensional (2D) grid map or may generate a 2.5-dimensional (2.5D) grid map, as shown in FIG. 3. However, the embodiment is not limited to a grid map having any specific number of dimensions.

After step 310, whether the absolute value of the y-coordinate (or y-axis coordinate) of the center of each grid on the grid map, output from the grid map generation unit 132, in the y-axis direction is less than a "y-axis coordinate threshold value" is checked (step 320). In this case, as shown in FIG. 2, the x-axis direction is the direction in which the host vehicle 10 travels, and the y-axis direction is the direction intersecting the x-axis direction.

Here, the y-axis coordinate threshold value may be determined by confirming in advance whether a problem occurs in clustering when labeling is performed using the y-axis coordinate threshold value before the method shown in FIG. 4 is performed.

If the absolute value of the y-coordinate is less than the y-axis coordinate threshold value, static labeling is performed (step 330). However, if the absolute value of the y-coordinate is not less than the y-axis coordinate threshold value, dynamic labeling (or adaptive labeling) is performed (step 340).

Steps 320 to 340 described above may be performed by the labeling unit 134.

Figure 5:
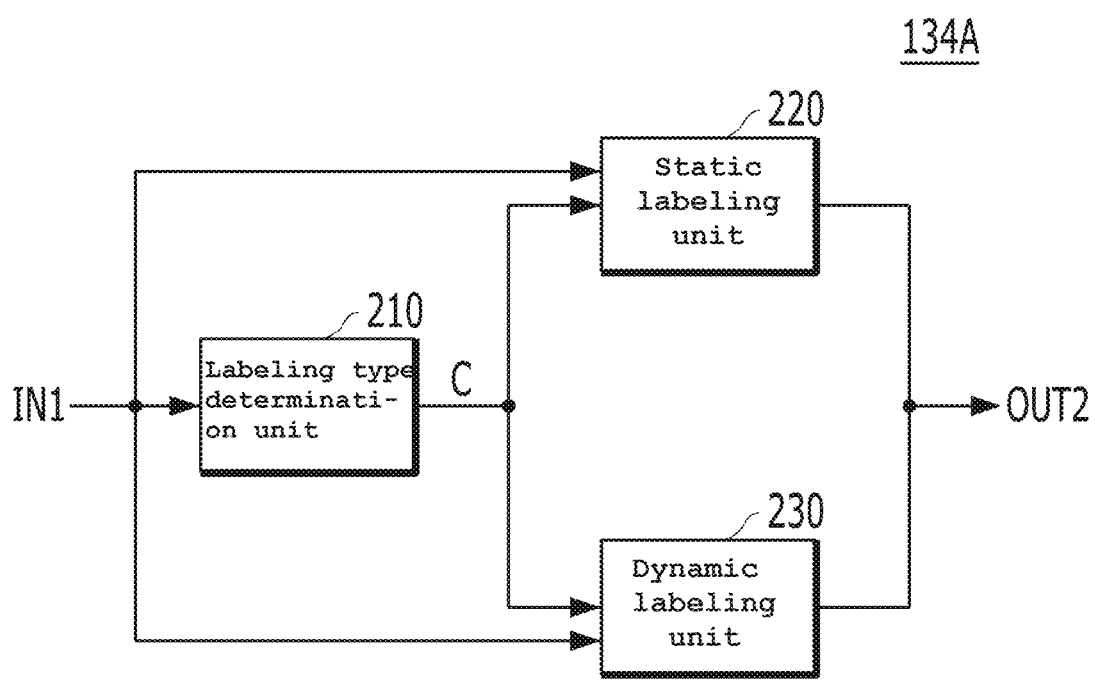
FIG. 5 is a block diagram of an embodiment of the labeling unit shown in FIG. 1.
Figure 6:
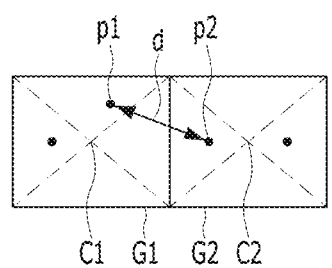
FIG. 6 is a diagram exemplarily showing a first grid and a second grid, which are compared with each other.

FIG. 5 is a block diagram of an embodiment 134A of the labeling unit 134 shown in FIG. 1. FIG. 6 is a diagram showing, by way of example, a first grid G1 and a second grid G2, which are compared with each other. Here, the first and second grids G1 and G2 may be grids that are adjacent to each other on the grid map, as illustrated in FIG. 6. In FIG. 2, the same parts as those shown in FIG. 6 are denoted by the same reference numerals.

The labeling unit 134A shown in FIG. 5 may include a labeling type determination unit 210, a static labeling unit 220, and a dynamic labeling unit 230.

In order to perform step 320, the labeling type determination unit 210 compares the absolute value of the y-coordinate of the center of each grid with the y-axis coordinate threshold value on the grid map, which is output from the grid map generation unit 132 and is provided through an input terminal IN, and outputs the result of the comparison as a control signal C to the static labeling unit 220 and the dynamic labeling unit 230. For example, the labeling type determination unit 210 may obtain the absolute value of the y-coordinate of each of the centers C1 and C2 of the first and second grids G1 and G2 shown in FIG. 6, which are compared with each other, and may compare the absolute value of the y-coordinate with the y-axis coordinate threshold value.

In order to perform step 330, the static labeling unit 220 operates in response to the control signal C. In other words, upon recognizing that the absolute value of the y-coordinate of the center of each grid is smaller than the y-axis coordinate threshold value based on the control signal C, the static labeling unit 220 may compare a spacing distance d with a first threshold value. The spacing distance d is between a first point (e.g. p1 shown in FIG. 6) and a second point (e.g. p2 shown in FIG. 6) located in the first grid and the second grid (e.g. G1 and G2 shown in FIG. 6), respectively, which are different from each other and are compared with each other. The first threshold value is a fixed value. The static labeling unit 220 may further include the first and second grids in the same cluster depending on the result of the comparison.

In order to perform step 340, the dynamic labeling unit 230 operates in response to the control signal C. In other words, upon recognizing that the absolute value of the y-coordinate of the center of each grid is not less than the y-axis coordinate threshold value based on the control signal C, the dynamic labeling unit 230 may determine whether to include the first and second grids G1 and G2, which are compared with each other, in the same cluster using a second threshold value TH2 and a third threshold value D.

Here, the second threshold value TH2 may vary depending on the first and second angles $\alpha_1$ and $\alpha_2$, which are respectively formed by the first and second points p1 and p2 based on the position p0 of the LiDAR sensor 110 and the spacing distance d between the first and second points p1 and p2. This is described later in more detail with reference to Equation 5 below. In addition, the third threshold value D may vary depending on the distances from the centers C1 and C2 to the first or second point p1 or p2 (e.g. the second point p2 shown in FIG. 6). This is described later in more detail with reference to Equations 9 and 10 below.

Figure 7:
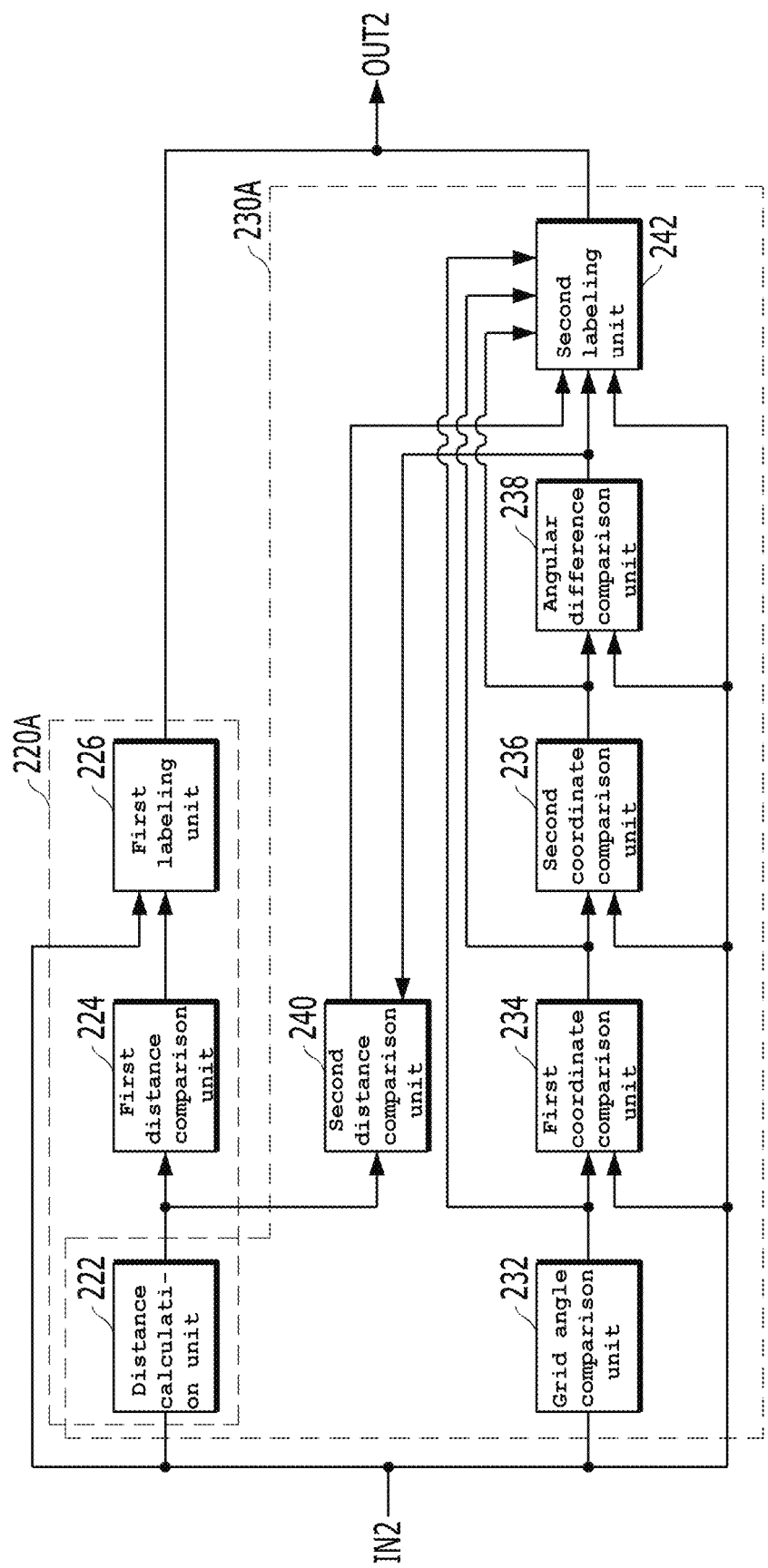
FIG. 7 is a block diagram of embodiments of the static labeling unit and the dynamic labeling unit shown in FIG. 5.

FIG. 7 is a block diagram of embodiments 220A and 230A of the static labeling unit 220 and the dynamic labeling unit 230 shown in FIG. 5.

Figure 8:
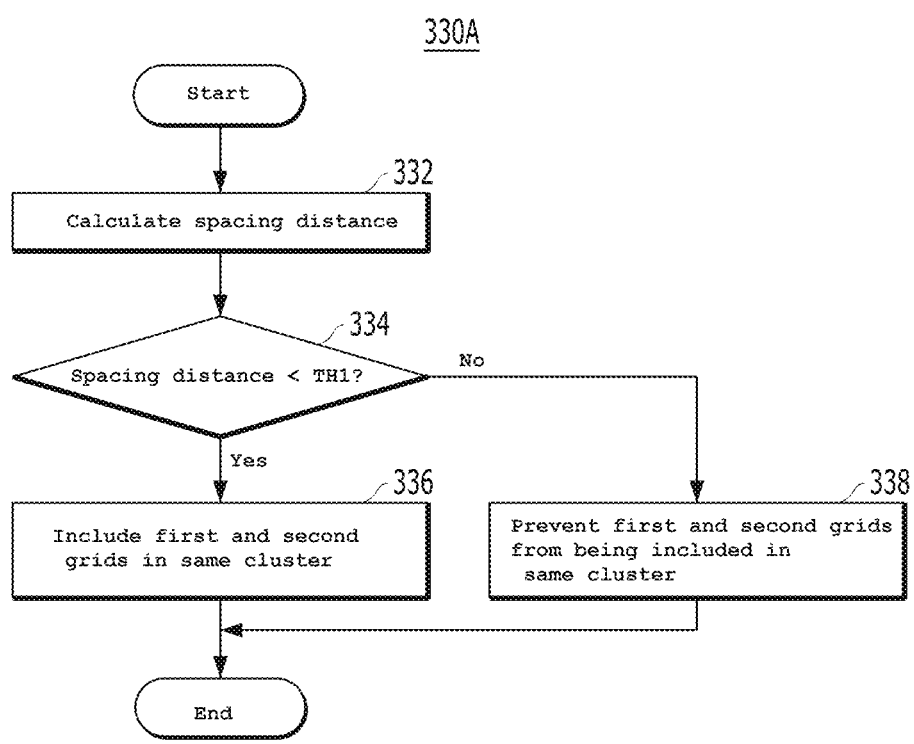
FIG. 8 is a flowchart of an embodiment of step 330 shown in FIG. 4.

FIG. 8 is a flowchart of an embodiment 330A of step 330 shown in FIG. 4.

In order to perform step 330A shown in FIG. 8, the static labeling unit 220A shown in FIG. 7 may include a distance calculation unit 222, a first distance comparison unit 224, and a first labeling unit 226.

Although step 330A shown in FIG. 8 is described as being performed by the static labeling unit 220A shown in FIG. 7, the embodiment is not limited thereto. In other words, according to another embodiment, step 330A shown in FIG. 8 may be performed by a static labeling unit configured differently from the static labeling unit 220A shown in FIG. 7, and the static labeling unit 220A shown in FIG. 7 may perform step 330 configured differently from step 330A shown in FIG. 8.

First, the distance calculation unit 222 calculates the spacing distance d between the first point and the second point, which are received through an input terminal IN2 (step 332).

After step 332, whether the spacing distance d is less than the first threshold value TH1 is checked (step 334).

For example, in order to perform step 334, the first distance comparison unit 224 may compare the spacing distance d calculated by the distance calculation unit 222 and the first threshold value TH1 and may output the result of the comparison to the first labeling unit 226.

Figure 13:
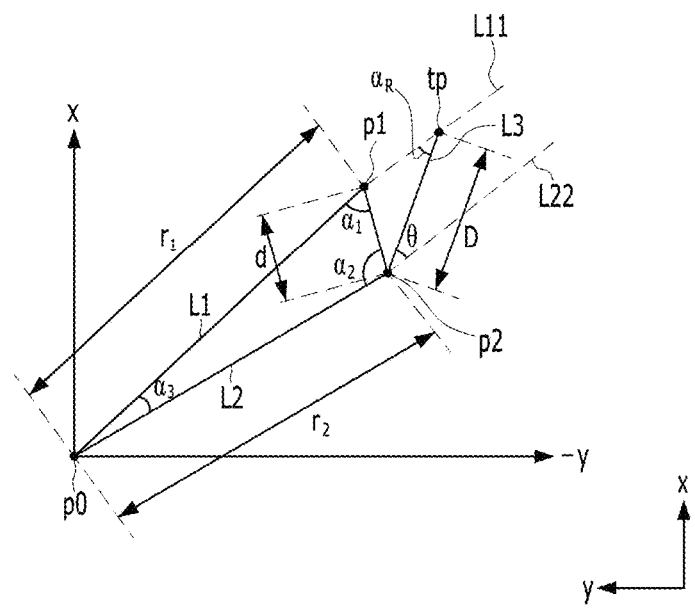
FIG. 13 is a graph to help understand the angular difference comparison unit shown in FIG. 7, the second distance comparison unit shown in FIG. 7, and steps 348 and 350 shown in FIG. 9.

Here, the first threshold value TH1 is a fixed value that is proportional to the sizes of the grids G1 and G2, irrespective of the angles (e.g. $\alpha_1$, $\alpha_2$ and as shown in FIG. 13, which is described later) formed by the points p1 and p2. Further, the first threshold value TH1 may be set in advance in consideration of the specifications of the LiDAR sensor 110.

If the spacing distance d is less than the first threshold value TH1, the first and second grids are included in the same cluster (step 336). However, if the spacing distance d is not less than the first threshold value TH1, the first and second grids are not included in the same cluster (step 338).

For example, in order to perform step 336, the first labeling unit 226 operates in response to the result of comparison by the first distance comparison unit 224. In other words, upon recognizing that the spacing distance d is less than the first threshold value TH1 based on the result of comparison by the first distance comparison unit 224, the first labeling unit 226 includes the first and second grids in the same cluster. In other words, the first and second grids, which are adjacent to each other, are grouped into one cluster.

However, in order to perform step 338, the first labeling unit 226 operates differently in response to the result of comparison by the first distance comparison unit 224. In other words, upon recognizing that the spacing distance d is not less than the first threshold value TH1 based on the result of comparison by the first distance comparison unit 224, the first labeling unit 226 does not include the first and second grids in the same cluster.

For example, in order to include the first grid and the second grid in the same cluster, the same identification (ID) number (or label) may be assigned to the first grid and the second grid, and information about the ID number may be output through an output terminal OUT2. A cluster, which is formed by clustering, may be distinguished from another cluster by the ID number assigned thereto, and grids to which the same ID number is assigned may be included in a single cluster.

According to the embodiment, in step 330 of performing static labeling, when the spacing distance d between the first point p1 and the second point p2 is determined to be short based on the first threshold value TH1, the same ID number may be assigned to the first and second grids G1 and G2, and the first and second grids G1 and G2 may be grouped into one cluster.

Figure 9:
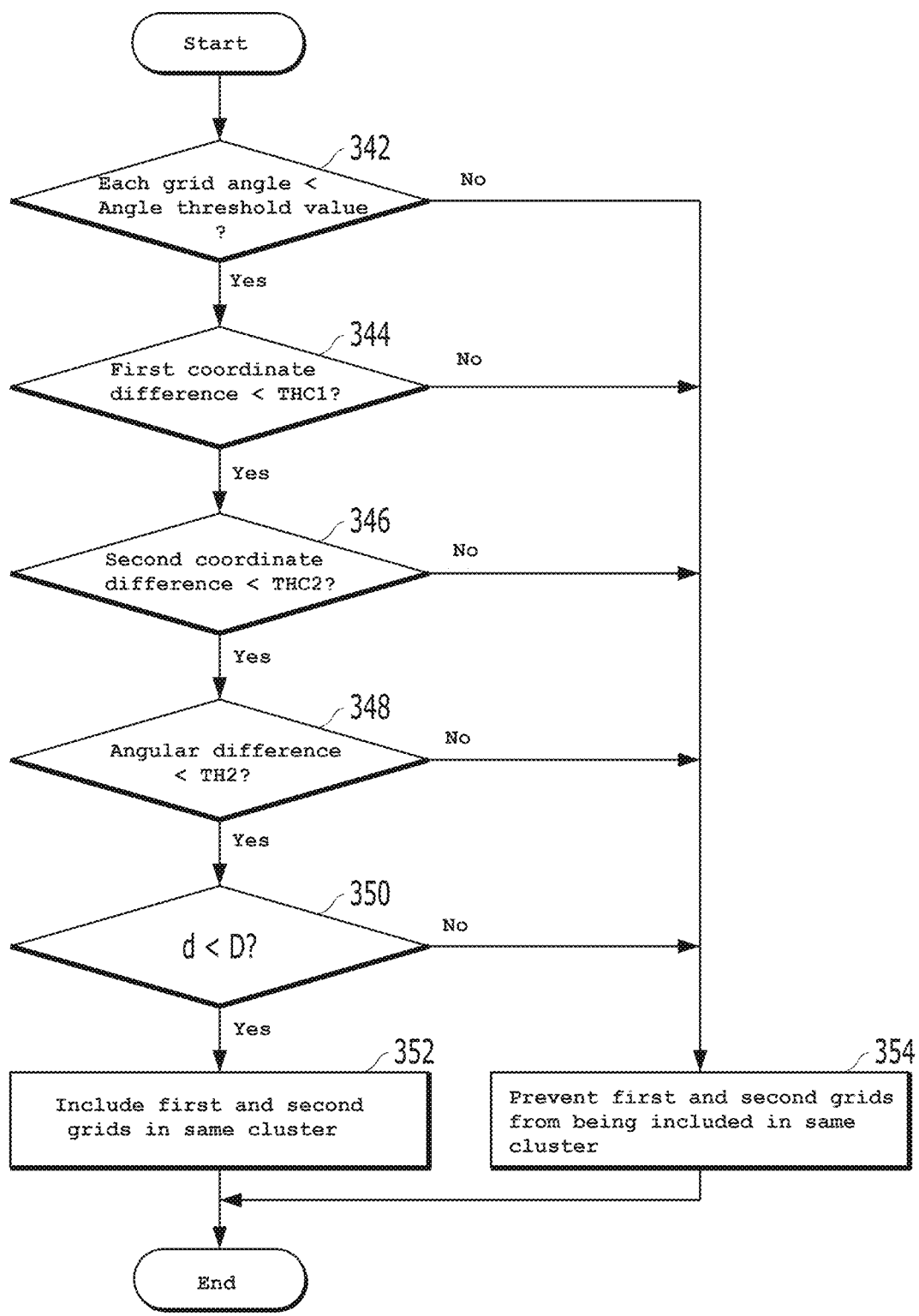
FIG. 9 is a flowchart of an embodiment of step 340 shown in FIG. 4.

FIG. 9 is a flowchart of an embodiment 340A of step 340 shown in FIG. 4.

In order to perform step 340A shown in FIG. 9, the dynamic labeling unit 230A shown in FIG. 7 may include a distance calculation unit 222, a grid angle comparison unit 232, first and second coordinate comparison units 234 and 236, an angular difference comparison unit 238, a second distance comparison unit 240, and a second labeling unit 242.

Although step 340A shown in FIG. 9 is described as being performed by the dynamic labeling unit 230A shown in FIG. 7, the embodiment is not limited thereto. In other words, according to another embodiment, step 340A shown in FIG. 9 may be performed by a dynamic labeling unit configured differently from the dynamic labeling unit 230A shown in FIG. 7, and the dynamic labeling unit 230A shown in FIG. 7 may perform step 340 configured differently from step 340A shown in FIG. 9.

First, whether the grid angle at which each grid is located with respect to the traveling axis, which passes through the position of the LiDAR sensor 110 and is parallel to the x-axis direction on the grid map, is less than an angle threshold value is checked (step 342). For example, referring to FIG. 2, in order to perform step 342, the grid angle comparison unit 232 checks whether the grid angles $\alpha_1$ and $\alpha_2$ at which respective grids (e.g. G1 and G2) are located with respect to the traveling axis DX, which passes through the position p0 of the LiDAR sensor 110 in the x-axis direction and is parallel to the x-axis, are less than an angle threshold value.

Here, the angle threshold value may be set so as to apply dynamic labeling to parts that have not undergone clustering by static labeling.

If each grid angle is less than the angle threshold value, whether a first coordinate difference between the y-axis coordinates of the first point and the second point in the y-axis direction is less than a first coordinate threshold value THC1 is checked (step 344).

For example, the first coordinate comparison unit 234 operates in response to the result of comparison by the grid angle comparison unit 232. In other words, upon recognizing that each grid angle is less than the angle threshold value based on the result of comparison by the grid angle comparison unit 232, the first coordinate comparison unit 234 compares the first coordinate difference with the first coordinate threshold value, and outputs the result of the comparison to the second coordinate comparison unit 236. Referring to FIG. 6, the first coordinate difference is the difference between the y-axis coordinate of the first point p1 and the y-axis coordinate of the second point p2.

Here, the first coordinate threshold value THC1 is set so as to restrict points that are located far from each other from being grouped into one cluster. The first coordinate threshold value THC1 is related to the maximum distance between points at which the points are capable of being grouped into one cluster.

If the first coordinate difference is less than the first coordinate threshold value, whether a second coordinate difference between the x-axis coordinates of the first point and the second point in the x-axis direction is less than a second coordinate threshold value THC2 is checked (step 346).

For example, in order to perform step 346, the second coordinate comparison unit 236 operates in response to the result of comparison by the first coordinate comparison unit 234. In other words, upon recognizing that the first coordinate difference is less than the first coordinate threshold value THC1 based on the result of comparison by the first coordinate comparison unit 234, the second coordinate comparison unit 236 compares the second coordinate difference with the second coordinate threshold value THC2, and outputs the result of the comparison to the angular difference comparison unit 238. Referring to FIG. 6, the second coordinate difference is the difference between the x-axis coordinate of the first point p1 and the x-axis coordinate of the second point p2.

Here, similar to the first coordinate threshold value THC1, the second coordinate threshold value THC2 is set so as to restrict points that are located far from each other from being grouped into one cluster. The second coordinate threshold value THC2 is set to be the maximum distance between points at which the points are capable of being grouped into one cluster. To this end, the second coordinate threshold value THC2 may be set differently depending on the x-axis coordinate and the y-axis coordinate through a two-dimensional look-up table (LUT) configured by accumulating data in a false-negative manner.

Hereinafter, a method of tuning the second coordinate threshold value THC2 according to an embodiment is described.

The second coordinate threshold value THC2 may vary depending on the positions of points that are compared with each other. In this case, when the second coordinate threshold value THC2 greatly increases, a clustering error may occur. In order to prevent this, the second coordinate threshold value THC2 may be set to an allowable value depending on the maximum values of the x-axis coordinate and the y-axis coordinate of each of the first and second grids G1 and G2.

In addition, the maximum value of the second coordinate threshold value THC2 may be determined through a region of interest (ROI)-based two-dimensional look-up table.

In addition, the second coordinate threshold value THC2 may be accumulated and tuned based on traveling data (logging data), with priority given to prevention of incorrect operation (i.e. from the perspective of false-negative). For example, incorrect operation occurrence data information, coordinates, the second coordinate threshold value THC2 for preventing incorrect operation, and explanation of an incorrect operation occurrence situation may be recorded in an incorrect operation occurrence data accumulation table for tuning the ROI-based two-dimensional look-up table.

The tuning of the second coordinate threshold value THC2 from the perspective of false-negative (with priority given to prevention of incorrect operation) may be performed by combining an optimization method and a heuristic method.

FIGS. 10A-12B are diagrams for explaining tuning of the second coordinate threshold value.

According to an embodiment, the second coordinate threshold value THC2 may be tuned as follows. Hereinafter, a "tuning parameter" refers to the second coordinate threshold value THC2.

Figure 10A:
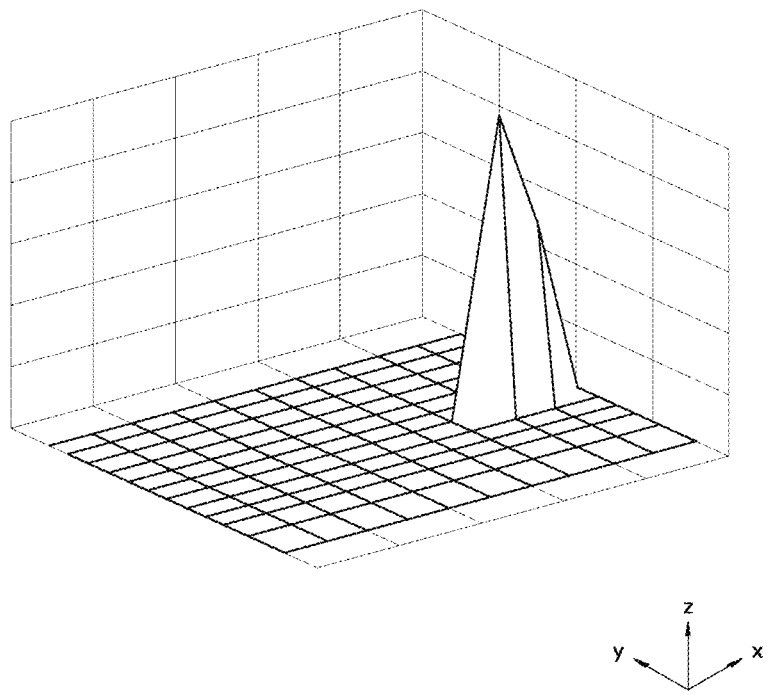
FIGS. 10A, 10B, 11A, 11B, 12A, and 12B are diagrams for explaining tuning of a second coordinate threshold value.
Figure 10B:
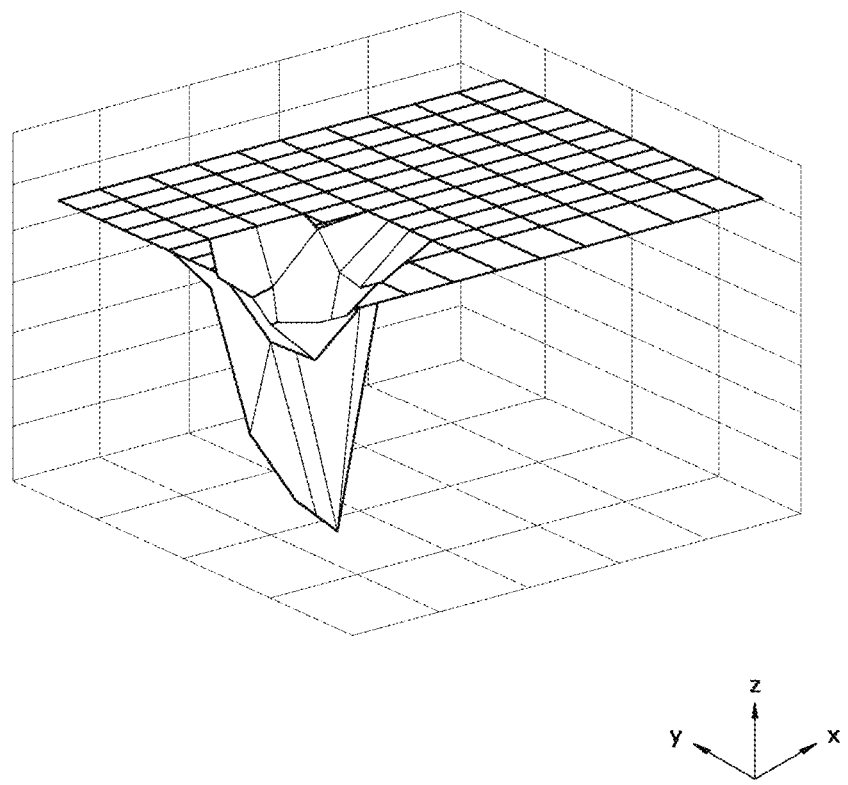

First, the initial value of the tuning parameter is determined. For example, FIG. 10A shows the initial value of a first tuning parameter, and FIG. 10B shows the initial value of a second tuning parameter.

Thereafter, a misrecognition (i.e. false recognition) situation of clustering is stored in a database. For example, "incorrect operation occurrence data information", "incorrect operation grid information", and "incorrect operation object ground truth (GT) information" may be recorded in respective databases. Examples of information that is recorded in each list in the database are as follows.

Information about a driving vehicle, a driving date, a driving sensor, and an incorrect operation occurrence frame may be recorded in the list of "incorrect operation occurrence data information". Information about the coordinates of points of grids, which are compared with each other, and other attributes of the points may be recorded in the list of "incorrect operation grid information". Information about the coordinates of a GT point and other attributes of the GT point may be recorded in the list of "incorrect operation object GT information".

Figure 11A:
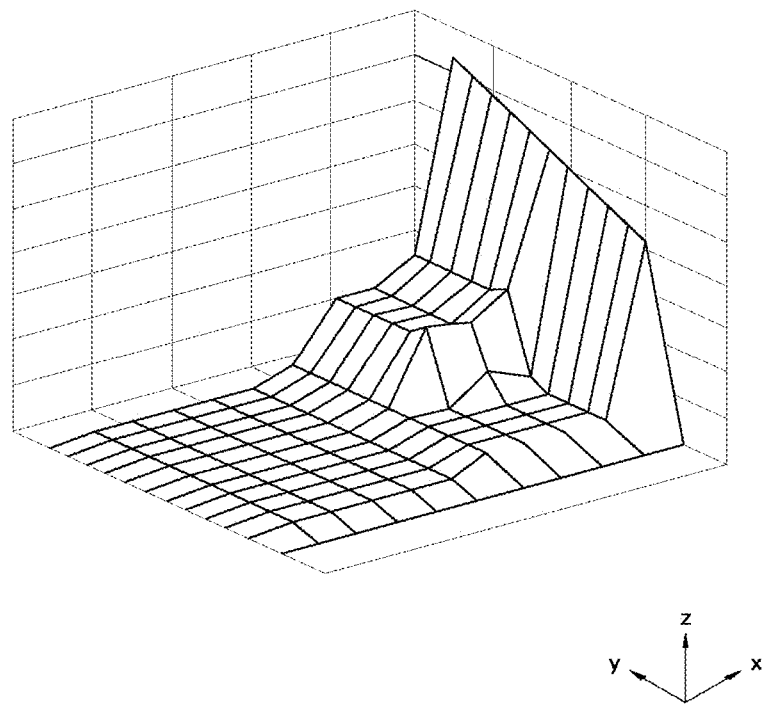
Figure 11B:
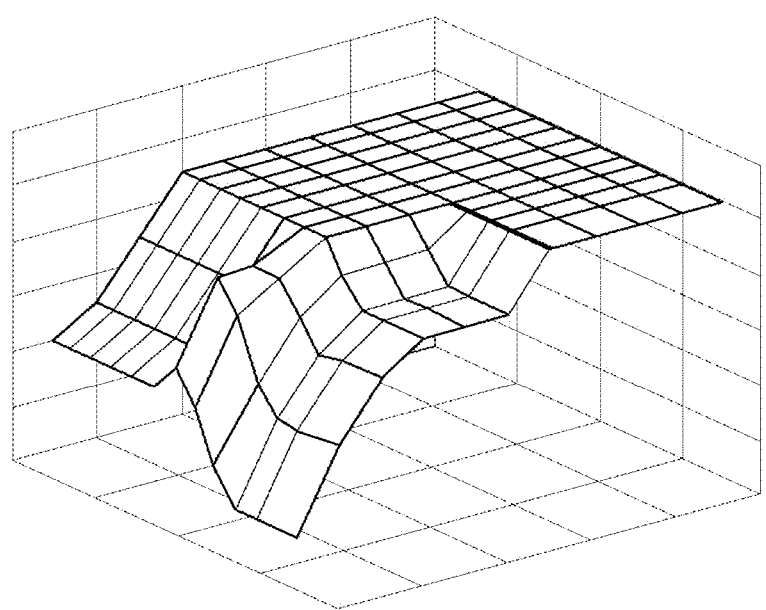

Thereafter, a tuning parameter for avoiding a misrecognition situation is detected (or, searched) in the database. For example, this may be performed using a gradient descent (optimization) method. FIG. 11A shows the learning (optimization) value of the first parameter, and FIG. 11B shows the learning value of the second parameter.

Thereafter, post-processing (e.g. a heuristic process) is performed on the detected tuning parameter. Here, the post-processing may be an operation of interpolating a tuning parameter using a phenomenon in which the coordinates of a point are maximized for each of one or more detected tuning parameters. For example, simplification, normalization and scaling processes may be performed for the post-processing.

Figure 12A:
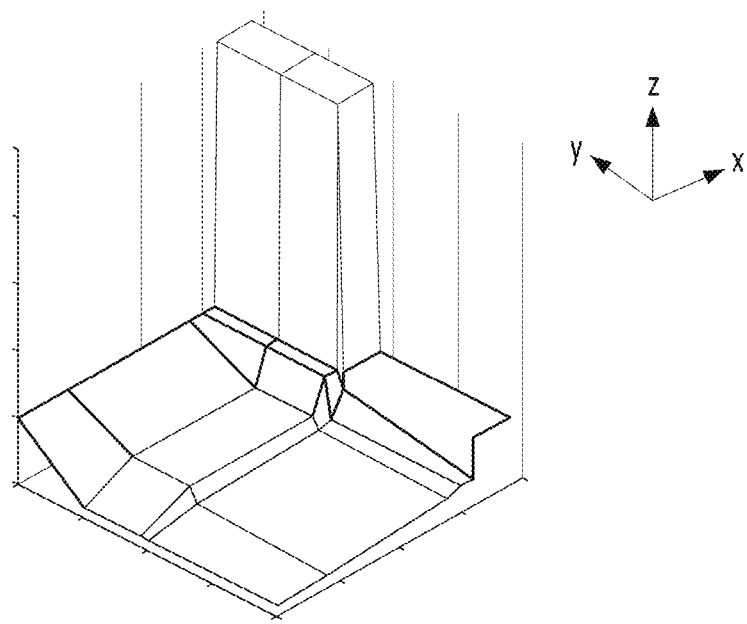
Figure 12B:
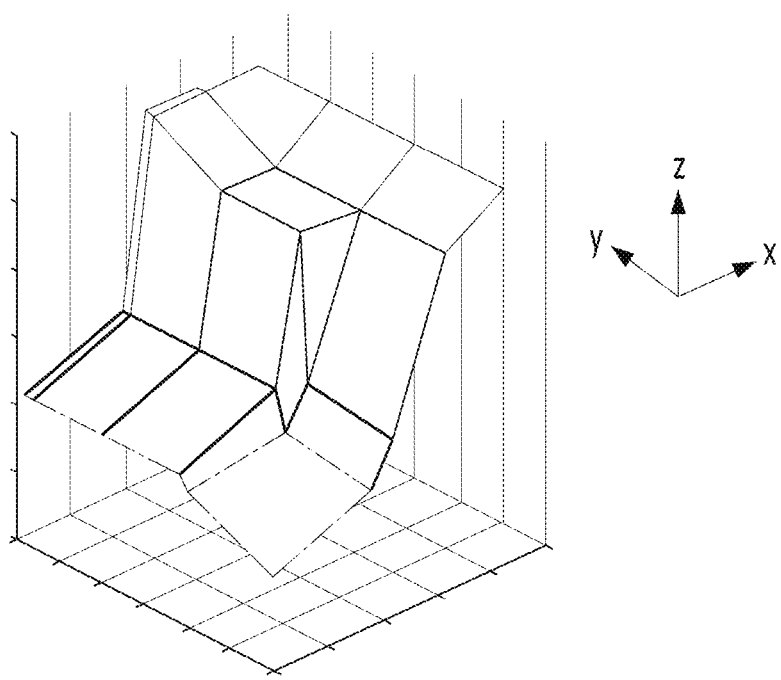

Thereafter, the post-processed tuning parameter is determined. For example, the tuning parameter may be determined by obtaining the coordinates of the result of the interpolation. FIG. 12A shows the determined value of the first parameter, and FIG. 12B shows the determined value of the second parameter.

Table 1 below shows examples of parameters used to determine a tuning parameter, which is subject to learning and selection.

TABLE 1

| Class. | Name of parameter | Unit | Value |
|---|---|---|---|
| 1 | YDIFF | m | THC1 used in step 344 of FIG. 9 |
| 2 | HDIFF | m | THC2 used in step 346 of FIG. 9 |
| 3 | LAMDA | — | θ in Equations 6 and 10 to be described later |
| 4 | ANGLE | — | TH2 used in step 348 of FIG. 9 |

Referring again to FIG. 9, when the second coordinate difference is less than the second coordinate threshold value THC2, among the internal angles of the triangle formed by the position of the LiDAR sensor 110 and the first and second points, whether the angular difference (or the absolute value of the angular difference) between a first internal angle formed at the position at which the first point is located and a second internal angle formed at the position at which the second point is located is less than the second threshold value TH2 is checked (step 348).

FIG. 13 is a graph to help understand the angular difference comparison unit 238 shown in FIG. 7, the second distance comparison unit 240 shown in FIG. 7, and steps 348 and 350 shown in FIG. 9. In FIG. 13, the horizontal axis represents the y-axis direction and the vertical axis represents the x-axis direction.

Referring to FIG. 13, the position p0 of the LiDAR sensor 110, the first point p1, and the second point p2 form one triangle. In this case, among the internal angles $\alpha_1$, $\alpha_2$ and as of the triangle, the first internal angle $\alpha_1$ is the internal angle formed at the position at which the first point p1 is located, the second internal angle $\alpha_2$ is the internal angle formed at the position at which the second point p2 is located, and the third internal angle as is the internal angle formed at the position p0 at which the LiDAR sensor 110 is located. The straight line connecting the position p0 of the LiDAR sensor 110 and the first point p1 is referred to as the "first line segment L1", and the straight line connecting the position p0 of the LiDAR sensor 110 and the second point p2 is referred to as the "second line segment L2". In this case, the third internal angle as is the angle between the first line segment L1 and the second line segment L2.

In addition, "d" represents the spacing distance between the first point p1 and the second point p2, "$r_1$" represents the length (or distance) from the position p0 of the LiDAR sensor 110 to the first point p1 (hereinafter referred to as the "first length"), and "$r_2$" represents the length (or distance) from the position p0 of the LiDAR sensor 110 to the second point p2 (hereinafter referred to as the "second length").

Hereinafter, step 348 is described with reference to FIG. 13.

In order to perform step 348, the angular difference comparison unit 238 operates in response to the result of comparison by the second coordinate comparison unit 236. In other words, upon recognizing that the second coordinate difference is less than the second coordinate threshold value THC2 based on the result of comparison by the second coordinate comparison unit 236, the angular difference comparison unit 238 compares the angular difference ($\alpha_1-\alpha_2$) (or the absolute value of the angular difference ($\alpha_1-\alpha_2$)) between the first internal angle $\alpha_1$ and the second internal angle $\alpha_2$ with the second threshold value TH2, and outputs the result of the comparison to the second distance comparison unit 240.

According to an embodiment, the second threshold value TH2 may vary in proportion to the angular difference (or the absolute value of the angular difference ($\alpha_1-\alpha_2$)) between the first internal angle $\alpha_1$ and the second internal angle $\alpha_2$.

Hereinafter, the relationship between the second threshold value TH2 and the angular difference ($\alpha_1-\alpha_2$) (or the absolute value of the angular difference ($\alpha_1-\alpha_2$)) is described with reference to FIG. 13.

First, in relation to the angular difference between the first internal angle $\alpha_1$ and the second internal angle $\alpha_2$, the following Equations 1 to 4 are obtained using the additive formula of the trigonometric function.

$$\sin\alpha_1 = \frac{r_2 \sin\alpha_3}{d} \quad \text{[Equation 1]}$$

$$\sin\alpha_2 = \frac{r_1 \sin\alpha_3}{d} \quad \text{[Equation 2]}$$

$$\sin\alpha_1 + \sin\alpha_2 = 2\sin\frac{\alpha_1+\alpha_2}{2}\cos\frac{\alpha_1-\alpha_2}{2} = \frac{(r_1+r_2)\sin\alpha_3}{d} \quad \text{[Equation 3]}$$

$$\cos\frac{\alpha_1-\alpha_2}{2} = \frac{(r_1+r_2)\sin\alpha_3}{d\sin\frac{\alpha_1+\alpha_2}{2}} \cong \frac{(r_1+r_2)\sin\alpha_3}{2d\sin(90°-\frac{\alpha_3}{2})} \quad \text{[Equation 4]}$$

When Equation 4 set forth above is transformed such that the second threshold value TH2 increases as the angular difference ($\alpha_1-\alpha_2$) between the first internal angle $\alpha_1$ and the second internal angle $\alpha_2$ increases, the second threshold value TH2 may have the relationship with the angular difference ($\alpha_1-\alpha_2$) expressed using Equation 5 below.

$$TH2 = 1 - \cos\frac{\alpha_1-\alpha_2}{2} = 1 - \frac{(r_1+r_2)\sin\alpha_3}{2d\sin(90°-\frac{\alpha_3}{2})} \quad \text{[Equation 5]}$$

In other words, in the triangle formed by the first and second points p1 and p2, which are compared with each other, and the position p0 of the LiDAR sensor 110, when one (e.g. $\alpha_2$) of the internal angles $\alpha_1$ and $\alpha_2$ of the two points p1 and p2 is an obtuse angle, the second threshold value TH2 is adjusted in the manner of being increased in proportion to the obtuse angle.

Thus, whether one of the internal angles $\alpha_1$ and $\alpha_2$ of the two points p1 and p2 of the triangle is an obtuse angle may be checked by performing step 348. In order to shorten the execution time, it is possible to determine whether one of the internal angles $\alpha_1$ and $\alpha_2$ of the two points p1 and p2 of the triangle is an obtuse angle by setting the second threshold value TH2 using the characteristics of the cosine graph and the fact that as is a small value close to 0.

Figure 14:
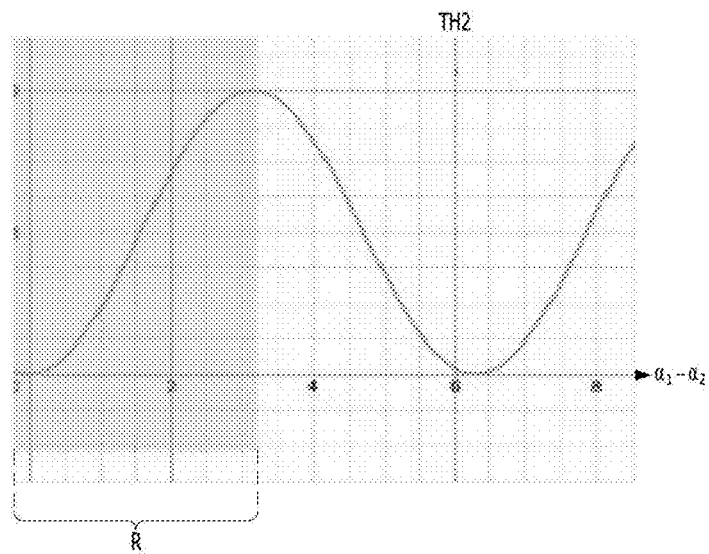
FIG. 14 is a graph showing the relationship between a second threshold value and an angular difference.

FIG. 14 is a graph showing the relationship between the second threshold value TH2 and the angular difference ($\alpha_1-\alpha_2$). In FIG. 14, the horizontal axis represents the angular difference ($\alpha_1-\alpha_2$), and the vertical axis represents the second threshold value TH2.

According to an embodiment, the second threshold value TH2 may be greater than 0 and less than 2 and may increase nonlinearly in proportion to the angular difference ($\alpha_1-\alpha_2$), as indicated by the section R in FIG. 14.

If the angular difference ($\alpha_1-\alpha_2$) (or the absolute value of the angular difference) is less than the second threshold value TH2, whether the spacing distance d is less than the third threshold value D is checked (step 350). Here, the spacing distance d may correspond to the spacing distance between the first point p1 and the second point p2 on the plane defined by the x-axis and the y-axis.

For example, in order to perform step 350, the second distance comparison unit 240 operates in response to the result of comparison by the angular difference comparison unit 238. In other words, upon recognizing that the angular difference ($\alpha_1-\alpha_2$) (or the absolute value of the angular difference) is less than the second threshold value TH2 based on the result of comparison by the angular difference comparison unit 238, the second distance comparison unit 240 compares the spacing distance d with the third threshold value D and outputs the result of the comparison to the second labeling unit 242.

For example, referring to FIG. 13, the following relationships are obtained, as expressed using Equations 6 to 8 below.

$$\alpha_R + \alpha_3 = \theta \quad \text{[Equation 6]}$$

Here, "$\alpha_R$" represents the angle between an extension line L11 of the first line segment L1, which is a straight line connecting the position p0 of the LiDAR sensor 110 and the first point p1, and a third line segment L3. Here, the third line segment L3 is a line segment connecting a threshold point tp and the second point p2. The threshold point tp is a point that is located on the extension line L11 of the first line segment L1, which is a straight line connecting the position p0 of the LiDAR sensor 110 and the first point p1, and is spaced apart from the second point p2 by a distance equivalent to the third threshold value D. Equation 6 may be transformed into Equation 7 below.

$$\alpha_R = \theta - \alpha_3 \quad \text{[Equation 7]}$$

$$\frac{r_2}{\sin\alpha_R} = \frac{D}{\sin\alpha_3} \quad \text{[Equation 8]}$$

Based on Equation 8 above, the third threshold value D is expressed using Equation 9 below.

$$D = \frac{r_2 \sin\alpha_3}{\sin\alpha_R} \quad \text{[Equation 9]}$$

The third threshold value D may also be expressed using Equation 10 below.

$$D = \frac{r_2 \sin\alpha_3}{\sin(\theta - \alpha_3)} + \beta \quad \text{[Equation 10]}$$

Here, "$\theta$" represents the angle between an extension line L22 of the second line segment L2 and the third line segment L2, and "P" is a parameter related to an error of the LiDAR sensor 110. Equations 9 and 10 may be utilized when "D" is greater than or equal to "d".

When the spacing distance d is less than the third threshold value D, the first and second grids G1 and G2 are included in the same cluster (step 352).

For example, in order to perform step 352, the second labeling unit 242 operates in response to the result of comparison by the second distance comparison unit 240. In other words, upon recognizing that the spacing distance d is less than the third threshold value D based on the result of comparison by the second distance comparison unit 240, the second labeling unit 242 includes the first and second grids in the same cluster. In other words, the first and second grids, which are adjacent to each other, are grouped into one cluster.

For example, in order to include the first grid and the second grid in the same cluster, the same identification (ID) number may be assigned to the first grid and the second grid, and information about the ID number may be output through the output terminal OUT2. Clusters formed by clustering may be distinguished from each other by the ID numbers thereof, and grids having the same ID number may be included in one cluster.

However, when the angle of each grid is not less than the angle threshold value, when the first coordinate difference is not less than the first coordinate threshold value THC1, when the second coordinate difference is not less than the second coordinate threshold value THC2, when the angular difference is not less than the second threshold value TH2, or when the spacing distance d is not less than the third threshold value D, the first and second grids are not included in the same cluster (step 354).

In order to perform step 354, the second labeling unit 242 operates in response to the result of comparison by the grid angle comparison unit 232. In other words, upon recognizing that the angle of each grid is not less than the angle threshold value based on the result of comparison by the grid angle comparison unit 232, the second labeling unit 242 does not include the first and second grids in the same cluster.

Alternatively, in order to perform step 354, the second labeling unit 242 operates in response to the result of comparison by the first coordinate comparison unit 234. In other words, upon recognizing that the first coordinate difference is not less than the first coordinate threshold value THC1 based on the result of comparison by the first coordinate comparison unit 234, the second labeling unit 242 does not include the first and second grids in the same cluster.

Alternatively, in order to perform step 354, the second labeling unit 242 operates in response to the result of comparison by the second coordinate comparison unit 236. In other words, upon recognizing that the second coordinate difference is not less than the second coordinate threshold value THC2 based on the result of comparison by the second coordinate comparison unit 236, the second labeling unit 242 does not include the first and second grids in the same cluster.

Alternatively, in order to perform step 354, the second labeling unit 242 operates in response to the result of comparison by the angular difference comparison unit 238. In other words, upon recognizing that the angular difference is not less than the second threshold value TH2 based on the result of comparison by the angular difference comparison unit 238, the second labeling unit 242 does not include the first and second grids in the same cluster.

Alternatively, in order to perform step 354, the second labeling unit 242 operates in response to the result of comparison by the second distance comparison unit 240. In other words, upon recognizing that the spacing distance d is not less than the third threshold value D based on the result of comparison by the second distance comparison unit 240, the second labeling unit 242 does not include the first and second grids in the same cluster.

Hereinafter, the object-tracking method and apparatus according to the embodiments are described in comparison with a comparative example.

Figure 15A:
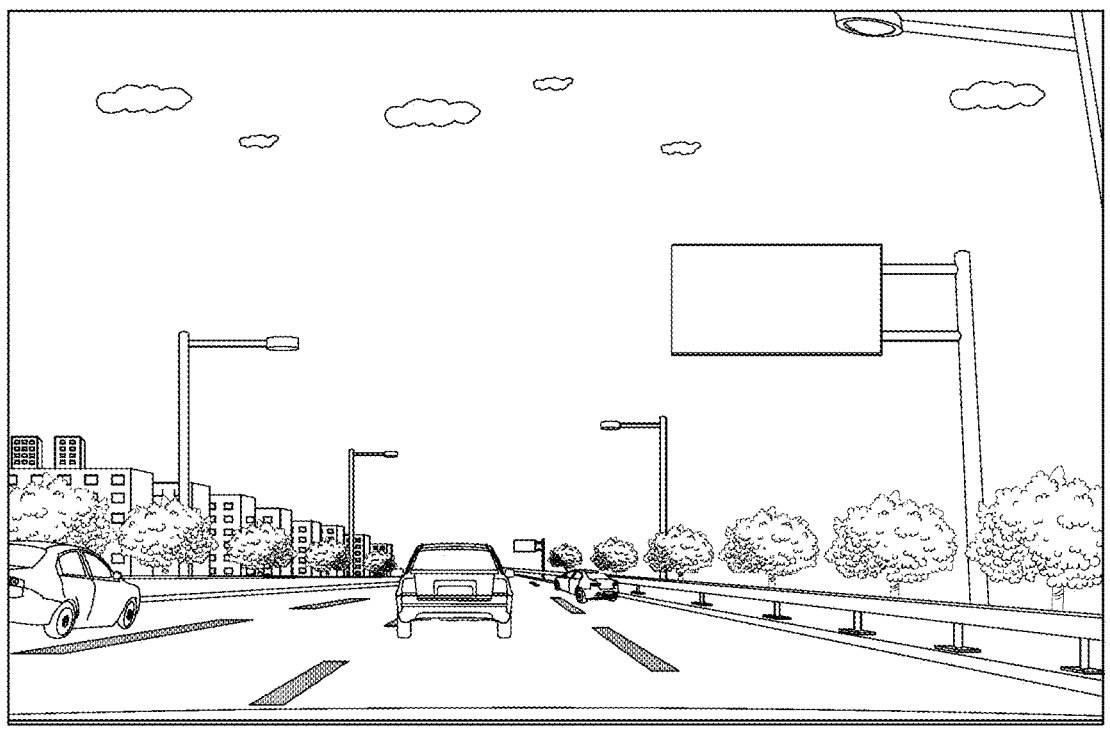
FIGS. 15A-15D are diagrams for explaining a comparison between a comparative example and the embodiment.
Figure 15B:
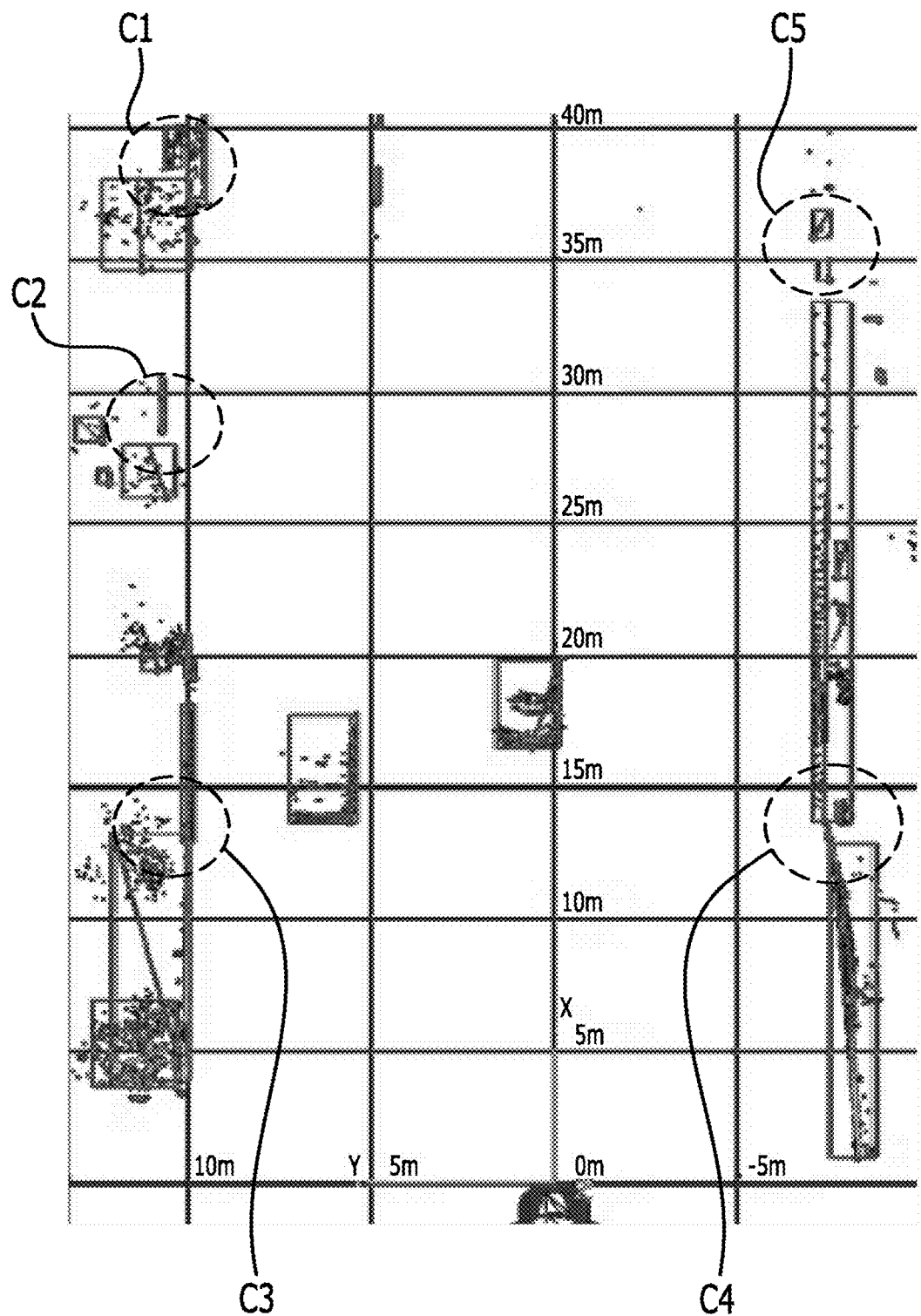
Figure 15C:
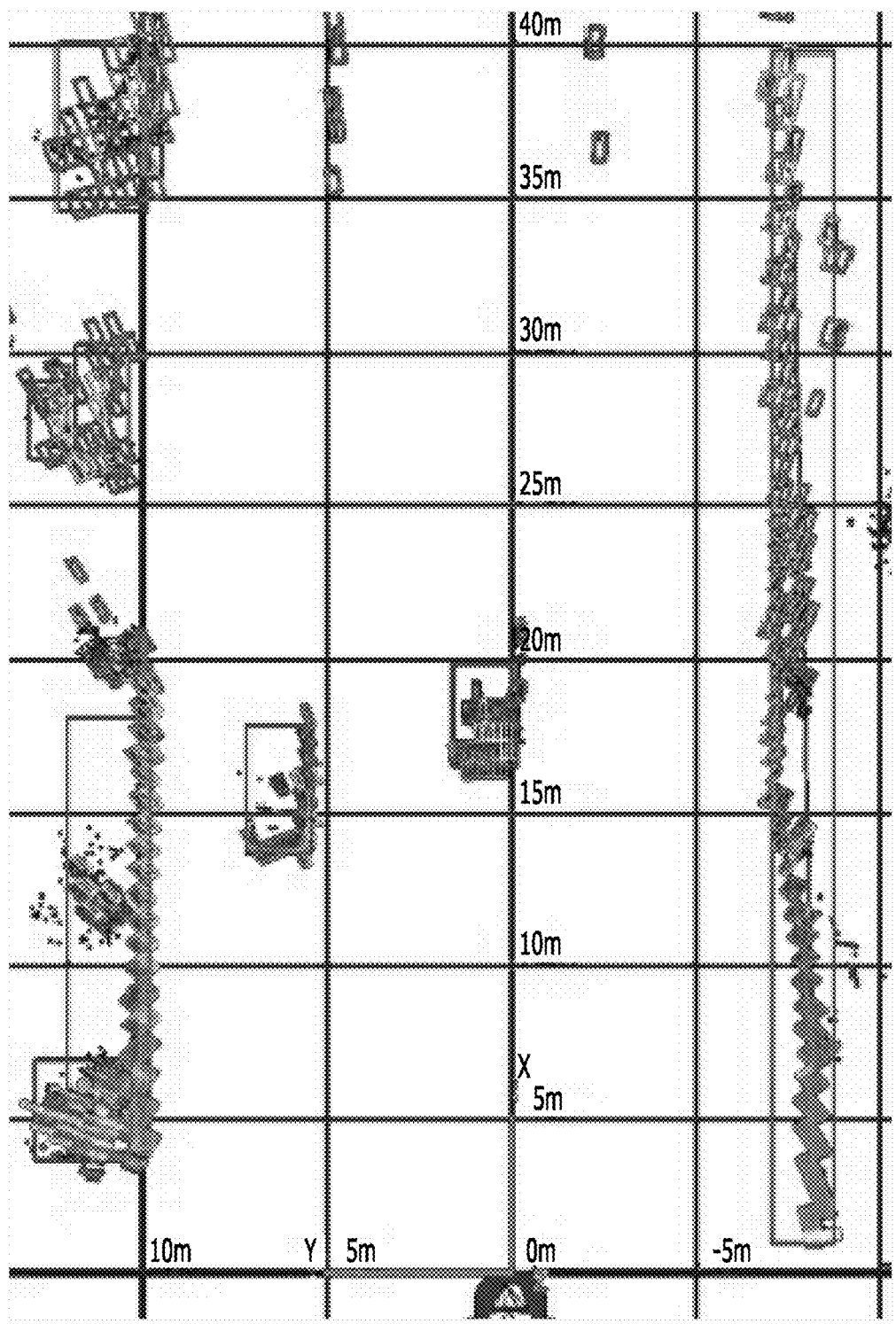
Figure 15D:
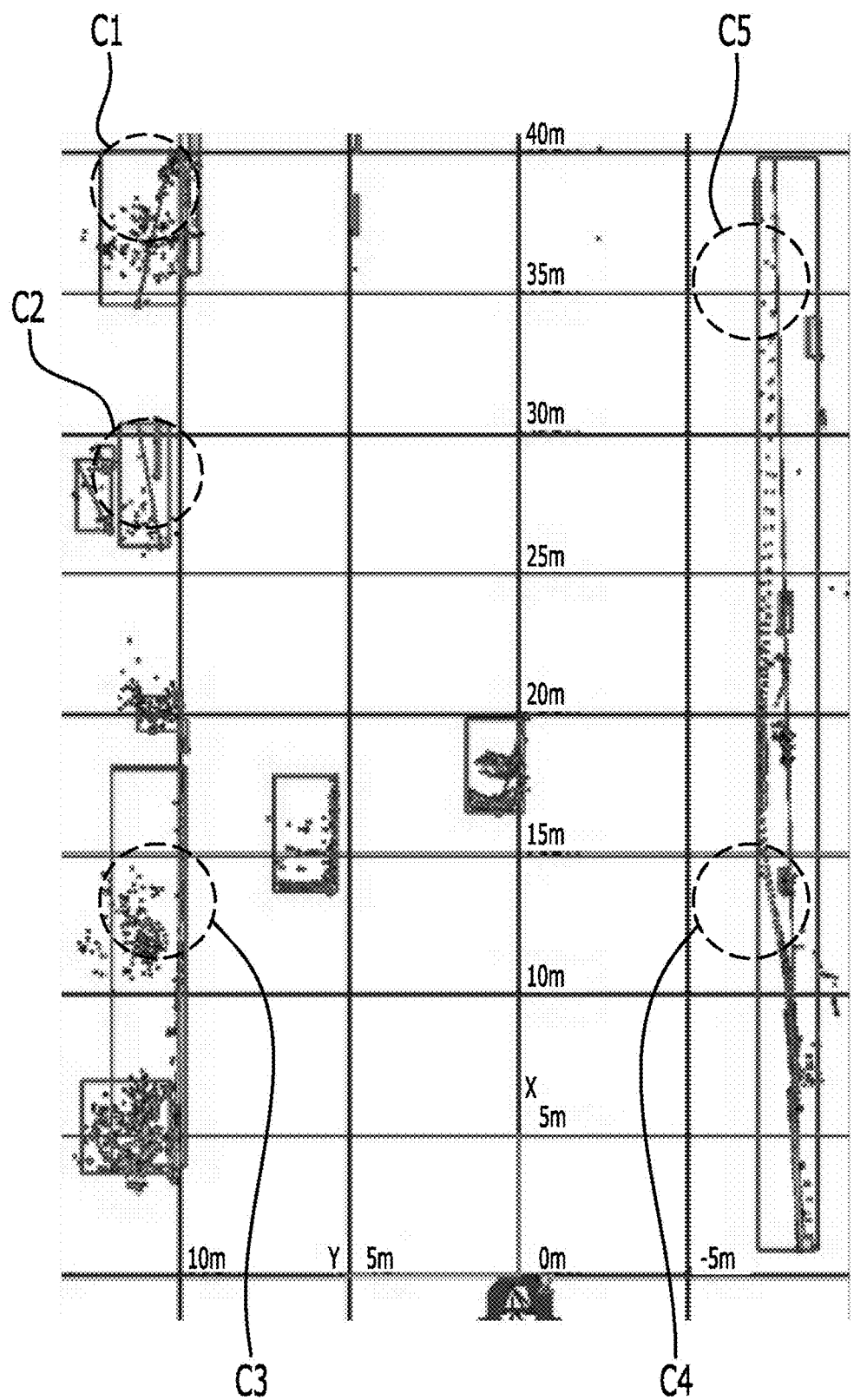

FIGS. 15A-15D are diagrams for explaining a comparison between the comparative example and the embodiment. FIGS. 15B and 15D show the results of clustering the situation shown in FIG. 15A.

In the comparative example, as shown in FIG. 3, when clustering is performed based on 2.5D grids, the distance d between the points p1 and p2 shown in FIG. 6 is compared with a threshold value to determine whether to group two neighboring grids into one cluster. In this case, the distance between neighboring points may vary. This is because the LiDAR sensor 110 radiates a laser pulse at a constant angle, even if an object (e.g. vehicles running in the same direction as the vehicle equipped with the LiDAR sensor) having a shape substantially perpendicular to the traveling direction of a vehicle equipped with the LiDAR sensor 110 and an object (e.g. a guardrail) having a shape substantially parallel to the traveling direction of a vehicle equipped with the LiDAR sensor 110 are located at similar positions. Nevertheless, in the comparative example, because the threshold value, which is the criterion for clustering to determine whether to group points into one cluster, is a fixed value, points detected from one object may be grouped into different clusters, rather than into one cluster. Thus, there is a problem in that the number of clusters greatly increases (i.e. over-segmentation). For example, in the comparative example, because clustering is performed using only static labeling, an excessive number of clusters may be obtained as a result of clustering, as shown in FIG. 15B.

However, according to the embodiment, threshold values (e.g. the second and third threshold values TH2 and D), which are the criteria for clustering, are applied differently depending on the angles formed by points of each of neighboring grids. Thus, unlike the comparative example, an excessive number of clusters are not generated. For example, when dynamic labeling is applied, an excessive number of clusters in each of C1 to C5 shown in FIG. 15B are clustered with each other by white grids, as shown in FIG. 15C. Thereby, as shown in FIG. 15D, a smaller number of clusters than those shown in FIG. 15B may be generated as a result of clustering. In other words, it can be seen that the number of clusters is greatly reduced in each of C1 to C5 shown in FIG. 15D, compared to the number of clusters shown in FIG. 15B.

In many cases, when clustering is performed using only static labeling, as in the comparative example, information about an object (e.g. a special vehicle or a guardrail) that is elongated due to the characteristics thereof is not output in a complete form because the distance between neighboring points is relatively large. Thus, this may adversely affect the performance with regard to, for example, shape analysis, tracking, and classification, which are performed subsequent to clustering. In contrast, according to the embodiment, since both static labeling and dynamic labeling are utilized, it is possible to improve the performance of outputting information about an object that is elongated, thus improving the performance of an autonomous driving system, such as prediction of a travel route and map matching.

Even when the distance between neighboring points is relatively large due to factors such as the resolution at which the LiDAR sensor 110 radiates a laser pulse and the angle at which an object is oriented, the embodiment is capable of achieving improved clustering within a short execution time.

As is apparent from the above description, according to the object-tracking apparatus and method of the embodiments, since both static labeling and dynamic labeling are utilized, it is possible to prevent generation of an excessive number of clusters and to improve the performance of outputting information about an object that is elongated. This improves the performance of an autonomous driving system, such as prediction of a travel route and map matching and achieves improved clustering within a short execution time.

However, the effects achievable through the disclosure are not limited to the above-mentioned effects. Other effects not mentioned herein should be clearly understood by those having ordinary skill in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment unless otherwise specified.

While the present disclosure has been particularly shown and described with reference to specific embodiments thereof, these embodiments are only proposed for illustrative purposes, and do not restrict the present disclosure. It should be apparent to those having ordinary skill in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. An object-tracking method using a LiDAR sensor, the object tracking method comprising:
   generating a grid map based on a point cloud generated with respect to an object using a LiDAR sensor mounted to a vehicle traveling in an x-axis direction;
   performing static labeling when an absolute value of a y-coordinate of a center of each grid on the grid map in a y-axis direction that intersects the x-axis direction is less than a y-axis coordinate threshold value; and
   performing dynamic labeling when the absolute value is not less than the y-axis coordinate threshold value,
   wherein, in the static labeling, a spacing distance between a first point and a second point, respectively located in a first grid and a second grid that are different from each other and are compared with each other, is compared with a first threshold value that is a fixed value, and the first grid and the second grid are included in a same cluster depending on a result of comparison, and
   wherein, in the dynamic labeling, whether to include the first grid and the second grid in a same cluster is determined using a second threshold value that varies depending on first and second angles, respectively formed by the first and second points based on a position of the LiDAR sensor, and the spacing distance and using a third threshold value that varies depending on a distance from the position of the LiDAR sensor to the first point or the second point.

2. The object-tracking method according to claim 1, wherein the performing the static labeling comprises:
   obtaining the spacing distance;
   checking whether the spacing distance is less than the first threshold value;
   including the first grid and the second grid in a same cluster when the spacing distance is less than the first threshold value; and
   preventing the first grid and the second grid from being included in a same cluster when the spacing distance is not less than the first threshold value.

3. The object-tracking method according to claim 1, wherein the performing the dynamic labeling comprises:
checking whether a grid angle at which each grid is located with respect to a traveling axis, passing through the position of the LiDAR sensor in the x-axis direction on the grid map, is less than an angle threshold value;
checking whether a first coordinate difference between y-axis coordinates of the first point and the second point is less than a first coordinate threshold value when the grid angle is less than the angle threshold value;
checking whether a second coordinate difference between x-axis coordinates of the first point and the second point is less than a second coordinate threshold value when the first coordinate difference is less than the first coordinate threshold value;
checking whether, among internal angles of a triangle formed by the position of the LiDAR sensor and the first and second points, an angular difference between a first internal angle being the first angle formed at a position at which the first point is located and a second internal angle being the second angle formed at a position at which the second point is located is less than the second threshold value when the second coordinate difference is less than the second coordinate threshold value;
checking whether the spacing distance is less than the third threshold value when the angular difference is less than the second threshold value; and
including the first grid and the second grid in a same cluster when the spacing distance is less than the third threshold value.

4. The object-tracking method according to claim 3, wherein the second threshold value varies in proportion to the angular difference between the first internal angle and the second internal angle.

5. The object-tracking method according to claim 4, wherein the second threshold value has a following relationship with the angular difference:

$$TH1 = 1 - \cos\frac{\alpha_1 - \alpha_2}{2} = 1 - \frac{(r_l + r_2)\sin\alpha_3}{2d\sin\left(90° - \frac{\alpha_3}{2}\right)}$$

where TH2 represents the second threshold value, d represents the spacing distance, $\alpha_1$ represents the first internal angle, $\alpha_2$ represents the second internal angle, $\alpha_3$ represents a third internal angle formed at a position at which the LiDAR sensor is located, among the internal angles of the triangle, $r_1$ represents a first length from the position of the LiDAR sensor to the first point, and $r_2$ represents a second length from the position of the LiDAR sensor to the second point.

6. The object-tracking method according to claim 5, wherein the second threshold value is greater than 0 and less than 2 and increases nonlinearly in proportion to the angular difference.

7. The object-tracking method according to claim 5, wherein the third threshold value is obtained as follows:

$$D = \frac{r_2 \sin\alpha_3}{\sin\alpha_R}$$

where D represents the third threshold value, and $\alpha_R$ represents an angle between an extension line of a straight line connecting the position of the LiDAR sensor and the first point and a third line segment,
wherein the third line segment is a line segment connecting a threshold point and the second point, and
wherein the threshold point is a point that is located on the extension line of the straight line connecting the position of the LiDAR sensor and the first point and is spaced apart from the second point by a distance equivalent to the third threshold value.

8. The object-tracking method according to claim 7, wherein the third threshold value is obtained as follows:

$$D = \frac{r_2 \sin\alpha_3}{\sin(\theta - \alpha_3)} + \beta$$

where $\theta$ represents an angle between an extension line of a straight line connecting the position of the LiDAR sensor and the second point and the third line segment, and $\beta$ represents a parameter related to an error of the LiDAR sensor.

9. An object-tracking apparatus using a LiDAR sensor, the object tracking apparatus comprising:
a LiDAR sensor mounted to a vehicle traveling in an x-axis direction, the LiDAR sensor being configured to generate a point cloud related to an object;
a grid map generation unit configured to generate a grid map based on the point cloud;
a labeling type determination unit configured to compare an absolute value of a y-coordinate of a center of each grid on the grid map in a y-axis direction that intersects the x-axis direction with a y-axis coordinate threshold value and to output a result of comparison as a control signal;
a static labeling unit configured to compare a spacing distance between a first point and a second point, respectively located in a first grid and a second grid that are different from each other and are compared with each other, with a first threshold value that is a fixed value in response to the control signal and to include the first grid and the second grid in a same cluster depending on a result of comparison; and
a dynamic labeling unit configured to determine whether to include the first grid and the second grid in a same cluster using a second threshold value that varies depending on first and second angles, respectively formed by the first and second points based on a position of the LiDAR sensor, and the spacing distance and using a third threshold value that varies depending on a distance from the position of the LiDAR sensor to the first point or the second point in response to the control signal.

10. The object-tracking apparatus according to claim 9, wherein the static labeling unit comprises:
a distance calculation unit configured to calculate the spacing distance;
a first distance comparison unit configured to compare the spacing distance with the first threshold value; and
a first labeling unit configured to include the first grid and the second grid in a same cluster in response to a result of comparison by the first distance comparison unit.

11. The object-tracking apparatus according to claim 9, wherein the dynamic labeling unit comprises:

a grid angle comparison unit configured to compare a grid angle at which each grid is located with respect to a traveling axis, passing through the position of the LiDAR sensor in the x-axis direction on the grid map, with an angle threshold value;

a first coordinate comparison unit configured to compare a first coordinate difference between y-axis coordinates of the first point and the second point with a first coordinate threshold value in response to a result of comparison by the grid angle comparison unit;

a second coordinate comparison unit configured to compare a second coordinate difference between x-axis coordinates of the first point and the second point with a second coordinate threshold value in response to a result of comparison by the first coordinate comparison unit;

an angular difference comparison unit configured to compare, among internal angles of a triangle formed by the position of the LiDAR sensor and the first and second points, an angular difference between a first internal angle being the first angle formed at a position at which the first point is located and a second internal angle being the second angle formed at a position at which the second point is located with the second threshold value in response to a result of comparison by the second coordinate comparison unit;

a second distance comparison unit configured to compare the spacing distance with the third threshold value in response to a result of comparison by the angular difference comparison unit; and a second labeling unit configured to include the first grid and the second grid in a same cluster in response to a result of comparison by the second distance comparison unit.

12. The object-tracking apparatus according to claim 11, wherein the second threshold value varies in proportion to the angular difference between the first internal angle and the second internal angle.

13. The object-tracking apparatus according to claim 12, wherein the second threshold value has a following relationship with the angular difference:

$$TH2 = 1 - \cos\frac{\alpha_1 - \alpha_2}{2} = 1 - \frac{(r_1 + r_2)\sin\alpha_3}{2d\sin\left(90° - \frac{\alpha_3}{2}\right)}$$

where TH2 represents the second threshold value, d represents the spacing distance, $\alpha_1$ represents the first internal angle, $\alpha_2$ represents the second internal angle, $\alpha_3$ represents a third internal angle formed at a position at which the LiDAR sensor is located, among the internal angles of the triangle, $r_1$ represents a first length from the position of the LiDAR sensor to the first point, and $r_2$ represents a second length from the position of the LiDAR sensor to the second point.

14. The object-tracking apparatus according to claim 13, wherein the second threshold value is greater than 0 and less than 2 and increases nonlinearly in proportion to the angular difference.

15. The object-tracking apparatus according to claim 13, wherein the third threshold value is obtained as follows:

$$D = \frac{r_2 \sin\alpha_3}{\sin\alpha_R}$$

where D represents the third threshold value, and a represents an angle between an extension line of a straight line connecting the position of the LiDAR sensor and the first point and a third line segment, wherein the third line segment is a line segment connecting a threshold point and the second point, and wherein the threshold point is a point that is located on the extension line of the straight line connecting the position of the LiDAR sensor and the first point and is spaced apart from the second point by a distance equivalent to the third threshold value.

16. The object-tracking apparatus according to claim 15, wherein the third threshold value is obtained as follows:

$$D = \frac{r_2 \sin\alpha_3}{\sin(\theta - \alpha_3)} + \beta$$

where $\theta$ represents an angle between an extension line of a straight line connecting the position of the LiDAR sensor and the second point and the third line segment, and $\beta$ represents a parameter related to an error of the LiDAR sensor.

* * * * *

UNITED STATES PATENT AND TRADEMARK OFFICE
CERTIFICATE OF CORRECTION

| | | |
|---|---|---|
| PATENT NO. | : 12,455,378 B2 | Page 1 of 1 |
| APPLICATION NO. | : 17/395261 | |
| DATED | : October 28, 2025 | |
| INVENTOR(S) | : Mu Gwan Jeong and Nam Gyun Kim | |

It is certified that error appears in the above-identified patent and that said Letters Patent is hereby corrected as shown below:

In the Claims

Claim 15, Column 22, Line 22:
"where D represents the third threshold value, and a"
Should be replaced with:
-- where D represents the third threshold value, and $\alpha_R$ --

Signed and Sealed this
Ninth Day of December, 2025

John A. Squires
*Director of the United States Patent and Trademark Office*